United States Patent [19]

Matousek

[11] Patent Number: 5,706,462
[45] Date of Patent: Jan. 6, 1998

[54] SELF OPTIMIZING FONT WIDTH CACHE

[75] Inventor: Jon Franklin Matousek, Bellevue, Wash.

[73] Assignee: Microsoft Corporation, Redmond, Wash.

[21] Appl. No.: 606,336

[22] Filed: Feb. 23, 1996

[51] Int. Cl.$^6$ .............................. G06F 12/10; G09G 5/22
[52] U.S. Cl. ............... 395/445; 395/497.01; 395/421.06; 345/193
[58] Field of Search ................................. 345/192, 193; 395/421.06, 497.01, 445

[56] References Cited

U.S. PATENT DOCUMENTS 5,450,595  9/1995  Chen et al. .................. 395/421.06
5,530,834  6/1996  Colloff et al. ................ 395/421.06

OTHER PUBLICATIONS

*The Unicode Standard: Worldwide Character Encoding, Version 1.0*, Jun. 1992, pp. inside cover, v, xi, and 1–6.
Custer, Helen, *Inside Windows NT*, 1993, pp. 40–44.

*Primary Examiner*—Eddie P. Chan
*Assistant Examiner*—Reginald G. Bragdon
*Attorney, Agent, or Firm*—Jones & Askew, LLP

[57] ABSTRACT

A self-optimizing font width cache provides an efficient caching mechanism for providing font widths to an application program. The font width cache acts as a font width server that services requests for widths for any given character. The font width cache maintains good system performance by minimizing the number of calls to the operating system without requiring an inordinate amount of memory for the font width cache. The font width cache is designed for use in conjunction with the Unicode character set, which assigns phonetic-based characters to a lower subrange of character codes and ideographic characters to an upper subrange. Each font realization is associated with a font width cache, which include two hash tables. One hash table is associated with each subrange of character codes. Both hash tables start out small and grow dynamically in response to the demands placed on the hash table by the data being displayed. The decision to increase the size of a hash table depends on the percentage of hash table slots that are in use and the number of collisions that have occurred when trying to access that hash table.

50 Claims, 7 Drawing Sheets

Displayed Text: This sentence includes one BOLD word and one *italicized* word. ← 300

Backing Store: This sentence includes one BOLD word and one italicized word. ← 310

Character Format Runs:

| # 1 | # 2 | # 3 | # 4 | # 5 |

← 320

Associated Font Width Cache:

| # 1 | # 2 | # 1 | # 3 | # 1 |

SELF OPTIMIZING FONT WIDTH CACHE

TECHNICAL FIELD

The present invention relates to a method for storing data associated with a set of elements, and more particularly relates to a self-optimizing cache for storing properties associated with characters included in the Unicode character set.

BACKGROUND OF THE INVENTION

Personal computers (PCs) such as IBM-compatible PCs use "glyphs" to display text on video monitors and print text on printers. A glyph is a visual depiction of a character. A font is a collection of glyphs. Before displaying or printing a string of text, an application program must format the text string so that it fits within the page or column boundaries of the particular display context. In order to determine how many characters fit on each line, the application program must be able to ascertain the width of each character in the text string.

In most cases, the fonts used by PCs are proportional fonts, which means that the distance between two characters varies from character to character (unlike old typewriters, in which the distances between all characters were fixed). Furthermore, the width of each character is determined by the particular font that is being displayed. The term "font" refers to a collection of glyphs, including letters, numerals and other symbols, that share a common design. The three primary elements of a font's visual design are typeface, style, and size.

Typeface refers to the design itself and includes the specific design characteristics of the characters in the font. For example, the typeface is characterized by the width of the strokes that make up the characters and by the presence or absence of serifs.

Style refers to the weight and slant of the font. The weight can range from thin to thick. The slant is typically described as roman (upright), oblique (artificially slanted), or italic (truly slanted).

Font size is specified or measured in points, where one point equals approximately 1/72 inch. The size of a font is generally measured from the bottom of a lower case "g" to the top of an upper case "M".

A glyph is a bitmap or outline that the computer's operating system uses to display each character in a font. Glyphs are representations or depictions of characters. A font is a collection of glyphs. The glyphs for each character in a font are stored in a font resource file, which is a library that contains font-related data. Glyphs may be scaled in order to be displayed or printed in a desired font size.

The term "font realization" refers to a specific combination of font attributes applied to one or more characters. By this definition, the font courier 12 point plain is a different font realization from courier 12 point bold. Similarly, the font helvetica 12 point bold is a different realization from helvetica 14 point bold.

Personal computers are configured to operate using one or more of several predefined character sets. Each character set contains punctuation marks, numerals, uppercase and lowercase letters, and all other printable characters. Each element or character in a character set is identified by a unique number known as a character code or character code point. Fonts are associated with the character set used by a personal computer and include a glyph for most, if not all, characters in a character set. The particular character set and fonts used by a computer will depend on the country in which the computer is used and the language spoken by the user.

Commonly used character sets include ASCII, ANSI and Unicode. The ASCII character set uses 7 bits to define characters for the 96 numeric values from 32 through 127. The ANSI character set uses 8 bits to represent up to 256 characters. A character set containing 256 characters is sufficient to represent western languages, including the diacritical marks used in French, German, Spanish, and other languages.

However, Eastern languages such as Chinese, Japanese and Korean, employ thousands of separate characters, which cannot be encoded using a single byte (8 bit) encoding scheme. The Unicode character set addresses this problem by using 16 bits to represent up to 65,536 (64K) characters. This number is enough to include all languages used in computer commerce today, as well as punctuation marks, mathematical symbols. The Unicode character set divides different types of characters into subranges and also includes room for future expansion. The Unicode character set establishes a unique code for each character to ensure that character translation is always accurate as text is transferred from one computer system to another.

As mentioned above, the process of displaying or printing text requires an application program to format strings of text so that they fit within page or column boundaries. In order to determine how may characters fit on each line, the application program must first ascertain the width of each character in the string. After an application program selects the appropriate font, sets the required text-formatting options, and determines the character width values for a string of text, it can begin drawing characters by calling the appropriate operating system functions.

An application program can determine the width of a character by calling the appropriate operating system function. For example, in Microsoft Corporation's "WIN32" application programming interface (API), which operates in conjunction with Microsoft Corporation's "WINDOWS 95" and "WINDOWS NT" operating systems, the GetCharWidth function returns the width of the specified character. This value is then used by the application program to perform the calculations required in order to format the text for display or printing.

Although an application can easily obtain character width information by calling the appropriate operating system function, these function calls are relatively time consuming and cause delays that are unsuitable for most high end application programs. This problem of response time has been addressed in the art by recognizing that it is much faster to read character width data from a memory cache or table than it is to call the operating system function. Therefore, the prior art has addressed the problem by providing a table within memory for storing the character width data for each font realization. Each table is gradually filled as the data is provided by the operating system.

With this prior art approach, an entire table is first allocated and initialized when a new font realization is encountered. When an application program requests the width data for a character, the prior art method checks to see if the width data has already been calculated and stored in the table. If not (e.g., this is the first time this character's width was needed), the prior art method gets the character width data by calling the operating system function. The value returned by the operating system is then stored in the table. If the application program requests width data that has already been calculated and stored in the table, the prior art method simply reads the width data from the table and returns that value to the application program.

The prior art approach of caching character width data in a table greatly decreases the average amount of time required for an application program to obtain character width data. However, the creation of each table requires the allocation of valuable memory resources. In the case of relatively small character sets such as the ASCII and ANSI character sets, the increase in performance is worth the relatively small amount of memory that must be allocated to a table with entries for each of the 128 or 256 characters used in the character set.

When the prior art approach is used with a 16-bit character set such as the Unicode character set, a conventional character width memory cache requires a table having 64K entries for each font realization. Although this approach effectively addresses the issue of response time, it creates a significant issue pertaining to the amount of storage space required to implement the cache. In a virtual memory environment, such large tables are likely to be swapped out or paged to the hard disk. When this occurs, the character width look-up process would be preceded by a page fault and a fetch from the hard disk before the stored data could be accessed. In such cases, large tables greatly decrease the efficiency that is realized when the prior art method is applied to small character sets.

Therefore, there is a need in the art for a method of caching character widths for 16-bit character sets without requiring a corresponding increase in the size of the memory cache. Such a method should provide quick, efficient access to cached character width data while keeping the size of each font width table as small as possible.

SUMMARY OF THE INVENTION

The present invention satisfies the above described need by providing a data cache that uses a separate dynamically expandable hash table for each subrange of elements in a set of elements, such as a character set. The cache may be used to store data, such as character width data, corresponding to the set of elements. The use of separate hash tables for each subrange in the element set allows the cache to provide good performance while reducing the amount of memory required for the cache. Memory requirements are further minimized by allowing each hash table to start small and grow dynamically in response to the demands placed on it.

Generally described, the present invention provides a method for providing a dynamically expandable cache for storing data associated with a set of elements. The method begins by providing a hash table for storing the data. The hash table includes "n" slots for storing the data for up to "n" elements. The method applies a hashing function to a code corresponding to a selected element. The hashing function provides a hash key that identifies a selected slot in the hash table. The method then determines whether the data corresponding to the selected element is stored in the selected slot in the hash table. If so, the data is retrieved from the hash table. Otherwise, the data is obtained from another source, such as the operating system, and stored in the hash table for later retrieval. The method then determines whether the performance of the hash table falls below a predetermined threshold and, if so, increases the number of slots in the hash table.

More particularly described, the hash tables of the present invention include the element code corresponding to the elements whose data is stored in the slots. Determining whether the data for the selected element is stored in the selected slot is accomplished by (1) retrieving the element code stored in the slot identified by the hash key and (2) comparing the retrieved element code to the element code for the selected element.

Still more particularly described, the present invention determines whether the performance of the hash table falls below the predetermined threshold by determining whether a predetermined percentage of the slots in the hash table are being used or whether a predetermined percentage of accesses to the hash table result in collisions.

In another aspect, the present invention provides a method for providing a memory cache for storing data corresponding to an element set having first and second element code subranges. The method provides a plurality of hash tables, including a first hash table for storing data corresponding to elements in the first element code subrange and a second hash table for storing data corresponding to elements in the second element code subrange. The method receives an element code corresponding to a selected element. The first hash table is selected if the element code corresponds to the first element code subrange and the second hash table is selected if the element code corresponds to the second element code subrange. The method applies a hashing function to the element code. The hashing function produces a hash key identifying a selected slot in the selected hash table. The method determines whether the data corresponding to the selected element is stored in the selected slot in the selected hash table. If so, the data is retrieved from the selected hash table. Otherwise, the data is obtained from another source and stored with its element code in the selected slot in the selected hash table.

In yet another aspect, the present invention provides a dynamically expandable font property memory cache for use in a computer system having memory, a font, an operating system, and a character set having first and second character code subranges. The font property memory cache includes a central processing unit (CPU) connected to the memory. The CPU is operative to provide a plurality of hash tables in the memory, including a first hash table for storing font properties corresponding to characters in the first character code subrange and a second hash table for storing font properties corresponding to characters in the second character code subrange. The CPU receives a character code corresponding to a selected character and selects the first or second hash table if the character code corresponds to the first or second character code subrange, respectively. The CPU applies a hashing function to the character code. The hashing function provides a hash key that identifies a selected slot in the selected hash table. The CPU then determines whether the font property corresponding to the selected character is stored in the selected slot in the selected hash table. If so, the font property corresponding to the selected character is retrieved from the selected hash table. Otherwise, the font property is obtained by calling the operating system. The CPU then determines whether the performance of the selected hash table falls below a predetermined threshold. If so, the number of slots in the selected hash table is increased.

In yet another aspect, the present invention provides a computer-readable medium on which is stored a computer program for operating a dynamically expandable memory cache for storing data associated with an element set having first and second element code subranges. The computer program includes instructions which, when executed by a computer, perform a series of steps. The steps include providing a plurality of hash tables, including a first hash table for storing data corresponding to elements in the first element code subrange and a second hash table for storing data corresponding to elements in the second element code subrange. The computer program receives an element code corresponding to a selected element and selects the first hash table if the element code corresponds to the first element code subrange and the second hash table if the element code corresponds to the second element code subrange. The computer program then applies a hashing function to the element code. The hashing function provides a hash key identifying a selected slot in the selected hash table. The program determines whether the data corresponding to the selected element is stored in the selected slot in the selected hash table. If so, the data corresponding to the selected element is retrieved from the selected hash table. Otherwise, the data is obtained from another source and stored in the selected hash table, thereby replacing the data that was there. The computer program then determines whether the performance of the selected hash table falls below a predetermined threshold. If so, the number of slots in the selected hash table is increased.

It is therefore an object of the present invention to provide an improved method for storing data associated with a set of elements.

It is a further object of the present invention to decrease the average amount of time required to provide data associated with elements that form a part of a set of elements.

It is a further object of the present invention to decrease the average amount of space required to store data associated with elements that form a part of large sets of elements.

It is a further object of the present invention to provide an improved method for storing font or character-related properties associated with large character sets.

It is a further object of the present invention to provide a self-optimizing font properties cache that provides adequate response time while minimizing memory requirements.

It is a further object of the present invention to provide a font width cache that uses at least one dynamically expandable hash table.

It is a further object of the present invention to provide a font width cache that utilizes separate hash tables for defined subranges in a character set.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3 is a diagram illustrating the manner in which an application program stores text and related attributes.

DETAILED DESCRIPTION OF THE PREFERRED EMBODIMENT

Figure 1:
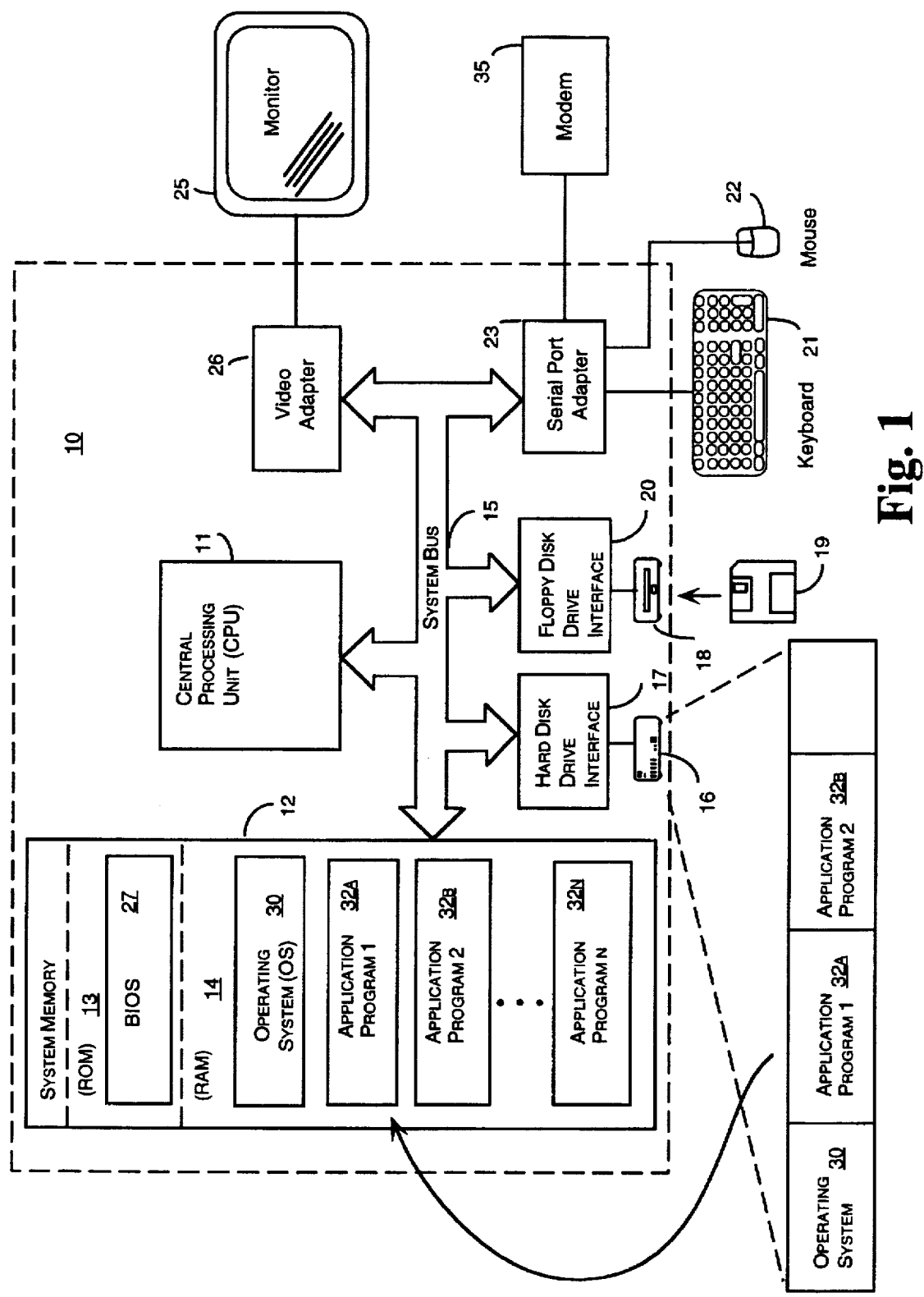
FIG. 1 is block diagram of a personal computer suitable for use in implementing the present invention.

The present invention provides a self-optimizing cache for storing font-related properties. The font-related properties, which may also be referred to as font metrics, parameters, features or attributes, include a variety of font data such as character width and values from glyph substitution tables, glyph X, Y adjustment tables, and justification information tables.

According to the invention, at least one cache is created for storing font properties as they are calculated by the operating system. Each cache provides at least one table for storing data. Where multiple tables are used, each table in the cache is associated with a specific subrange of the character code set. Each table starts out small and grows dynamically in response to the demands placed on it. Performance-related statistics, including the number of slots in use, the number of accesses and the number of collisions, are maintained for each table and updated each time the table is accessed. In order to reduce collisions and increase performance, the size of a table is increased if a predetermined percentage of the slots in the table are being used or if the statistics indicate that the percentage of collisions experienced by the table has exceeded a predetermined threshold.

The present invention is particularly suited for use with the Unicode international character set, which includes 64K possible characters that are grouped into various subranges according to their type. In the preferred embodiment, the present invention takes advantage of the fact that the character codes may be separated into three subranges. The character codes assigned to the Western-style phonetic characters are grouped together in a first subrange. The character codes assigned to the Chinese-Japanese-Korean (CJK) ideograhic characters are grouped together in a second subrange. The character codes assigned to the Korean Hangul syllable characters are grouped together in a third subrange. A table is provided for each subrange. Each table grows independently depending on the demands placed on it.

Although the preferred embodiment will be generally described in the context of an operating system and application program running on an IBM-compatible personal computer, those skilled in the art will recognize that the present invention also can be implemented in conjunction with other operating systems for other types of computers. Accordingly, it will be understood that the terms "operating system" and "computer" generally include all types of computers and the operating systems designed for them.

Turning first to the nomenclature of the specification, the detailed description that follows is represented largely in terms of processes and symbolic representations of operations by conventional computer components, including a central processing unit (CPU), memory storage devices for the CPU, and connected display devices. These operations include the manipulation of data bits by the CPU and the maintenance of these bits within data structures resident in one or more of the memory storage devices. Such data structures impose a physical organization upon the collection of data bits stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, records, structures, files or the like. It should be kept in mind, however, that these and similar terms should be associated with appropriate physical quantifies for computer operations, and that these terms are merely conventional labels applied to physical quantities that exist within and during operation of the computer.

It should also be understood that manipulations within the computer are often referred to in terms such as adding, dividing, comparing, moving, etc. which are often associated with manual operations performed by a human operator. The operations described herein are machine operations performed in conjunction with various input provided by a human operator or user that interacts with the computer. The machines used for performing the operation of the present invention include general purpose digital computers or other similar computing devices.

In addition, it should be understood that the programs, processes, methods, operating systems, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now the drawings, in which like numerals represent like elements throughout the several figures, the present invention and the preferred operating environment will be described.

The Operating Environment

Figure 2:
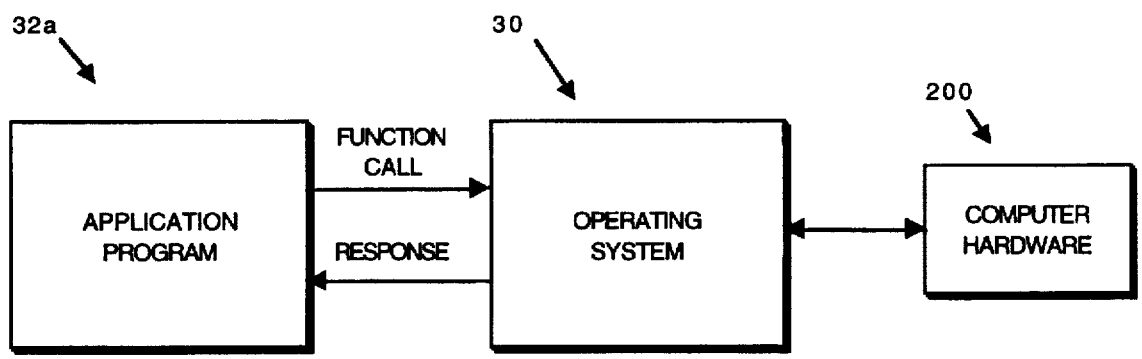
FIG. 2 is a block diagram illustrating the interface between a computer's input/output devices, an operating system, and an application program.

FIGS. 1 and 2 illustrate various aspects of the preferred computing environment in which the present invention is designed to operate. Those skilled in the art will immediately appreciate that FIGS. 1 and 2, and the associated discussion, are intended to provide a brief, general description of the preferred computer hardware and operating system, and that additional information is readily available in the appropriate programming manuals, user's guides, and similar publications.

FIG. 1 illustrates a conventional IBM-compatible personal computer 10 suitable for implementing the present invention. As shown in FIG. 1, the personal computer 10 includes a central processing unit (CPU) 11, such as the model 80486 or "PENTIUM" microprocessors manufactured by Intel Corporation of Santa Clara, Calif. The personal computer also includes system memory 12 (including read only memory (ROM) 13 and random access memory (RAM) 14), which is connected to the CPU 11 by the system bus 15. A hard disk drive 16 is connected to the system bus 15 via the hard disk drive interface 17. A floppy disk drive 18, which is used to read from or write to a floppy disk 19, is connected to the system bus 15 via a floppy disk drive interface 20. A keyboard 21 and a mouse 22 are connected to the system bus 15 via a serial port adapter 23. A monitor 25 is connected to the system bus 15 via a video adapter 26. A modem 35 may be connected to the system bus 15 via the serial port adapter 23. The modem 35 may be used to allow the computer 10 to be connected to the Internet or to other dial-up or on-line services.

Although many other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as the operating system, application programs and data are provided to the personal computer 10 via one of its memory storage devices, which may include the ROM 13, RAM 14, hard disk drive 16, floppy disk 19, and a CD-ROM (not shown). In the preferred personal computer 10, the hard disk drive 16 is used to store data and programs, including the operating system and application programs.

When the personal computer 10 is turned on or reset, the Basic Input/Output System (BIOS) 27, which is stored in the ROM 13, instructs the CPU 11 to load the operating system 30 from the hard disk drive 16 into the RAM 14. Once the operating system 30 is loaded into RAM 14, the CPU 11 executes the operating system code and causes the visual elements associated with the user interface of the operating system 30 to be displayed on the monitor 25. When an application program 32a is opened by a user, the program code and relevant data are read from the hard drive 16 and stored in the RAM 14.

The preferred embodiment of the present invention is designed to operate in conjunction with Microsoft Corporation's "WIN32" application programming interface (API) running on Microsoft Corporation's "WINDOWS 95" or "WINDOWS NT" operating systems. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

FIG. 2 is a simplified block diagram illustrating the interaction between the computer hardware 200, the operating system 30, and an application program 32a. Referring now to FIGS. 1 and 2, the operating system 30 is loaded into RAM 14 (FIG. 1) when the computer 10 is turned on or reset. The operating system 30 (in conjunction with the BIOS 27 and device drivers) provides the basic interface between the computer's resources, the user, and the application program 32a. The operating system 30 interprets and carries out instructions issued by the user. For example, when the user wants to load an application program 32a, the operating system 30 interprets the instruction (e.g., double clicking on the application program's icon) and causes the CPU 11 to load the program from the hard disk drive 16 into RAM 14. Once the application program 32a is loaded into RAM 14, it is executed by the CPU 11. In case of large programs, the CPU 11 loads various portions of program into RAM 14 as needed.

The operating system 30 also provides a variety of functions or services that allow application program to easily deal with various types of input/output (I/O). This allows an application program 32a to issue relatively simple function calls that cause the operating system 30 to perform all of the steps required to accomplish various tasks, such as displaying text on the monitor 25 (FIG. 1) or printing text on an attached printer (not shown).

Generally described (with reference to FIG. 2), the application program 32a communicates with the operating system 30 by calling predefined functions provided by the operating system 30. The operating system 30 responds by provided the requested information or executing the requested task.

In the context of the present invention, the primary interaction between application programs and the operating system involves the function calls and responses related to fonts and text output. For example, in the preferred computer system 10, an application program 32a can call the operating system's GetCharWidth and GetCharWidthFloat functions to obtain the advance width for the individual characters in a string of text. The advance width is the distance that the cursor on a video display or the printhead on a printer must advance before printing the next character in a string of text. The GetCharWidth function returns the advance width as an integer value. The GetCharWidthFloat function returns the advance width as a fractional advance width value. An application program can obtain actual character width data by calling the GetCharABCWidths and GetCharABCWidthsFloat functions.

An application program can also call an operating system function to compute the width of an entire string of text. If a string of text does not include tab characters, an application program can call the GetTextExtentPoint function to obtain the width and height of a specified string. If the string contains tab characters, an application can use the GetTabbedTextExtent function. Those skilled in the art will appreciate that this approach is less efficient than creating and using a memory cache to store and retrieve character widths once they are calculated and provided by the operating system. Most high end application programs compute string width one character at a time using some type of caching technique in order to maintain acceptable performance.

After an application program selects the appropriate font, sets the requires text-formatting options, and computes the necessary character width and height values for a string of text, it can begin drawing characters by calling any of the text-output functions provided by the operating system. For example, the preferred operating system provides the ExtTextOut, TextOut, and DrawText functions for drawing character strings and formatted text.

At this point, it should be appreciated that operating systems such as the "WINDOWS 95" operating system are quite complex and provide a wide variety of services that allow users and application programs to utilize the resources available in the personal computer. Those skilled in the art will be familiar with operating systems and their various features, which include, but are in no means limited to the specific messages and functions described above. For more comprehensive information regarding the "WINDOWS 95" operating system and its interaction with application programs, the reader may refer to any of a variety of publications, including the Guide to Programming, which is part of the Microsoft Windows Software Development Kit (published by Microsoft), and the Win32 Programmer's Reference (published by Microsoft Press), which are incorporated herein by reference.

The Unicode Character Set

The preferred embodiment of the present invention is designed to be used in conjunction with the Unicode character set, which is a 16-bit world-wide character encoding standard developed by the Unicode Consortium of San Jose, Calif. The Unicode character set encompasses virtually all characters that are currently widely used in computers. The allocated characters include most of the world's written scripts, publishing characters, mathematical and technical symbols, and punctuation marks. International character sets such as Unicode are useful for the international transmission of data via the Internet and other means.

Version 2.0 of the Unicode standard is expected to be released in early 1996. The Unicode Consortium currently publishes two documents that, taken together, define Version 1.1 of the Unicode standard. These documents include *The Unicode Standard, Worldwide Character Encoding, Version 1.0*, Volumes 1 and 2, and *The Unicode Standard, Version 1.1 Prepublication Edition*, which are incorporated herein by reference. The preferred embodiment of the present invention and the WINDOWS 95 and WINDOWS NT 3.51 operating systems incorporate the encoding scheme associated with Unicode Version 2.0.

Those skilled in the art will be familiar with the International Standards Organization (ISO) 10646 standard, which also defines universal character sets. The ISO 10646 standard defines a 16-bit encoding standard known as UCS-2 (Universal Character Set containing 2 bytes), and a 32-bit encoding standard known as UCS-4 (Universal Character Set containing 4 bytes). The character code values of ISO 10646 and Unicode version 1.1 are precisely the same.

Those skilled in the art will appreciate that phonetic character sets are those whose characters represent sounds. This describes most western alphabets. On the other hand, ideographic characters sets includes symbols that actually represent words. Ideographic character sets, such as Chinese, Japanese and Korean, typically include thousands of characters or symbols.

Generally described, the Unicode character set allocates various subranges of character codes to certain languages or types of characters. For purposes of the present invention, the most important subrange split in Unicode Version 2.0 occurs at the character code point U+4E00 hexadecimal (hex). The character codes for the various phonetic alphabets are assigned to the range U+0000→U+4DFF hex. In the range above U+4DFF, the Chinese-Japanese-Korean (CJK) ideographic characters are assigned to the range U+4E00→U+ABFF hex, and the Korean Hangul syllable characters are included in the range U+AC00→U+FFFF hex.

The self-optimizing font width cache of the present invention uses three hash tables. The widths for the characters in the lower subrange (U+0000→U+4DFF hex) are stored in a first hash table. The widths for the characters in the middle subrange (U+4E00→U+ABFF hex) are stored in a second hash table. The widths for the characters in the upper subrange (U+AC00→U+FFFF hex) are stored in a third hash table. This is advantageous because, with respect to the phonetic characters, it is less likely that a single document will have mixed, multilingual text composed of characters from more than one subrange that forms a part of the range U+0000→U+4DFF hex. This property provides significant improvement in overall cache performance. Those familiar with the Unicode standard will appreciate that not all subranges have been defined, and that other important defining splits may be created in the future.

Definitions Relating to Fonts and Character Sets

Before proceeding to the description of the preferred method for caching font metric data, it is helpful to provide definitions for terms commonly associated with fonts and character sets. Some of these terms were introduced previously in the discussion of the background of the invention.

Character: an element of a computer character set

Character code or character code point: A specific code that represents a particular character in a character set.

Character set: a collection of alphabetic, numeric, and other characters used to organize, control, or represent information.

Font: a collection of glyphs that share a common design. The three primary elements of the visual design are typeface, style, and size. Fonts are used by computer to display text on monitors and print text on printers.

Font property, attribute, feature, or metric: a specific characteristic of a font, which can include a variety of data such as character width and the values glyph substitution tables, glyph X, Y adjustment tables, justification information tables, etc.

Font realization: a specific combination of font attributes as selected into a particular display context. For example, the font courier 12 point plain is a different realization from courier 12 point bold. Similarly, the font helvetica 12 point bold is a different realization from helvetica 14 point bold.

Font size: the size of the font is generally measured from the bottom of a lower case "g" to the top of an upper case "M". The size is typically specified in points, where one point equals approximately 1/72 inch.

Glyph: a bitmap or outline that represents or depicts each character in a font, and which the operating system uses to display each character in a font. The glyphs for each character in a font are stored in a font resource file, which is a library that contains font-related data. Glyphs may be scaled in order to be displayed or printed in a desired size. Each character in a font is represented by a glyph.

Glyph metrics: a collection of properties that specify the relative size along with other features of a glyph.

Logical font: the precise font that an application program would like the operating system to use to display text.

Realized font: the actual font that a logical font is mapped into by an operating system. Preferably, the logical font is mapped into a realized font that exactly matches the specified attributes. If an exact match is not available, the realized font is the closest match available as determined by the operating system.

Style: the weight and slant of the font. The weight can range from thin to thick. The slant is typically described as roman (upright), oblique (artificially slanted), or italic (truly slanted).

Typeface: the specific design characteristics of the characters in the font. For example, the typeface is characterized by the width of the strokes that make up the characters and by the presence or absence of serifs.

Hashing Functions and Hash Tables

The preferred embodiment of the present invention employs hashing functions and hash tables. A general description of hashing is useful in order to provide background for the discussion that follows.

As described above, the prior art teaches caching font widths in order to increase performance. However, the prior art caches provide one slot for each character in the character set. Although this approach maximizes performance by making character width data readily available, it requires prohibitive amounts of memory in the Unicode case.

In an attempt to balance performance with the amount of memory required, hash tables are used to decrease the amount of memory used by a data cache in cases where only a small number of data elements from a given set of data may actually be used. Generally described, hashing is an indexing technique in which a numerical function (known as a hashing function) is applied to the value of an input element in order to provide a computed index or key. Hash tables provide fewer slots than the number of elements that may need to be stored and require a computed index or key in order to look up information stored in the table.

A significant problem with the use of hash tables is that because there are more elements in the possible set (in this case, character codes in a character set) than there are slots in the hash table, multiple pieces of information may map to the same slot in the hash table. When one data element is mapped to a slot that contains data associated with another data element, this is referred to as a collision. Because of the possibility of collisions, hash tables are said to provide lossy storage, meaning that the desired data may not be in the hash table when requested. When this occurs, the desired data will need to be obtained by some other means (in this case, by calling the appropriate operating system function). The performance of a system that employs a hashing function is inversely related to the number of collisions that occur. Therefore, collision prevention and resolution are major issues in hash table design. The problem of collisions may be addressed by selecting a hashing function that will distribute the data among all possible hash table slots. Collisions can also be reduced by utilizing the characteristics of the data being hashed.

In summary, an input element (e.g., a character code) is mapped to a slot in the hash table by applying a hashing function to the input element. The result of the hash function is a hash key, which identifies the location or slot in the hash table where the corresponding piece of information (e.g., character width) can be found. In the present case, the hashing function reduces memory requirements by allowing many characters to be mapped to a single slot, but with the tradeoff of having collisions between the many characters that map to a single slot. Performance is primarily a function of trying to minimize collisions. Hashing functions, which can range from very simple to complex, are selected in order to strike a balance between performance and memory requirements. The operation of the hash tables employed in the present invention, and the particular hashing functions used, are described below.

The Preferred Method For Caching Font Width Data

As described above, the present invention provides a self-optimizing cache for storing font width data. The preferred embodiment of the present invention is intended for use with the Unicode international character set. Each character code is a 16 bit value, which means that the character set can include up to 64K characters. In the preferred embodiment, the present invention takes advantage of the fact that three different ranges of character code points are used to represent different types of characters. As described above, western phonetic characters are assigned to a lower range from U+0000→U+4DFF hex, CJK ideographic characters are assigned to a middle range from U+4E00→U+ABFF hex, and Korean Hangul syllable characters are assigned to an upper range from U+AC00→U+FFFF hex.

Each self-optimizing font width cache uses three hash tables. The widths for the characters in the lower range are stored in a first hash table, the widths for the characters in the middle range are stored in a second hash table, and the widths for the characters in the upper range are stored in a third hash table. This is advantageous because, with respect to the phonetic characters, it is less likely that a single document will have mixed, multilingual text composed of characters from more than one subrange in the lower range from U+0000→U+4DFF hex. This property allows the associated hash table to remain relatively small and provides significant improvement in overall cache performance.

According to the preferred embodiment of the present invention, a separate font width cache is created for storing font widths associated with each font realization. Each cache includes three hash tables, and stores the font widths and corresponding character codes as the width values are provided by the operating system. The hash tables for each font realization start out small and expand dynamically in response to the demands placed on it by the data in the document that is being displayed. A slots-in-use counter, an access counter and a collision counter are used to maintain performance-related statistics for each hash table. These counters are updated each time the cache is accessed. The size of the hash table is increased if a predetermined percentage of the slots in the hash table are being used or if the statistics indicate that the hash table has experienced a predetermined percentage of collisions. This allows a hash table to remain small if a document uses only a few characters in a particular realized font.

FIG. 3 illustrates the relationship between displayed text, and the data maintained by the application program and operating system. Sample displayed text is illustrated at 300. The sentence that forms the displayed text is displayed in the Times Roman font. The sentence includes one bold word and one italicized word. The bold and italicized words are separated by plain Times Roman text.

Those skilled in the art will understand that application programs, such as word processors, typically store text as plain or raw text and separately store the corresponding or related attributes. In FIG. 3, the raw text 310 includes the characters themselves (including upper and lower case letters and punctuation), but does not include the formatting data (e.g., bold, italic, etc.). The raw text is stored in what is called a backing store. Each character is associated with a character position, which indicates the character's offset or position with respect to the beginning of the document.

The formatting information that corresponds to the raw text is stored separately in what are called character format runs 320. A separate character format run is associated with each font realization, where more than one format run may share a font realization (as FIG. 3 demonstrates). A new character format run begins with each change in any of the font attributes, such as font, size, style, etc. In FIG. 3, character format run #1 begins with the first character of the sentence. The data in character format run #1 indicates that the associated text in the backing store 310 is formatted as plain Times Roman text.

Character format run #2 is associated with the second realized font, which begins with the word "BOLD". The data in character format run #2 indicates that the associated text in the backing store is formatted as bold Times Roman text.

Continuing this example, character format run #3 is associated with the third realized font, which begins when the formatting returns to the plain Times Roman text. Character format run #4 is associated with the fourth realized font, which begins with the change to the italicized Times font. Character format run #5 is associated with the fifth realized font, which begins with the return to the plain Times Roman font. Those skilled in the art will appreciate that the character format runs are used to store the attributes associated with the corresponding plain text in the backing store.

FIG. 3 also illustrates the manner in which the font width caches of the present invention are provided for each realized font. As mentioned above, a font width cache is used to store and retrieve font width data. Because the character width depends on the specific attributes of each font, each font width cache can only store the widths associated with a single font realization. However, the widths associated with each realized font will all be stored in the same font width cache regardless of which character format run the realized font is associated with. FIG. 3 illustrates this by showing three font width caches 330 associated with the five character format runs. Font width cache #1 is associated with character format runs #1, #3, and #5, which all describe the same realized font (plain Times Roman). Font width caches #2 and #3 are associated with character format runs #2 and #4, respectively, which each describe different realized fonts.

Those skilled in the art will understand that text having more than one font realization is referred to as "rich text." From the foregoing example, it will be apparent that rich text requires multiple font width caches. It is well known to use a table for each font realization. However, in the prior art, the size of each table is fixed and includes a slot for each character in the character set used by the computer. The present invention provides a self-optimizing font width cache whose size varies in accordance with the number of characters in each realized font that appears in a document.

In the preferred embodiment, the maximum number of font width caches is 16. If more than 16 are needed, the program applies a least recently used algorithm to determine which of the existing caches should be destroyed and recycled. Those skilled in the art will appreciate that the maximum number of font width caches is flexible and may be determined in accordance with the amount of memory available and other criteria. The operation of each font width cache is described in detail below.

In order for an application program to render rich text or multiple lines of text to an output device, it must first format the text. The primary task of formatting multiple lines is to determine where to break the text across multiple line boundaries. This requires the application program to measure the text and determine where the text overflows the boundaries of the display. A boundary is the maximum width for a given line and may be variable for irregular layouts.

Figure 4:
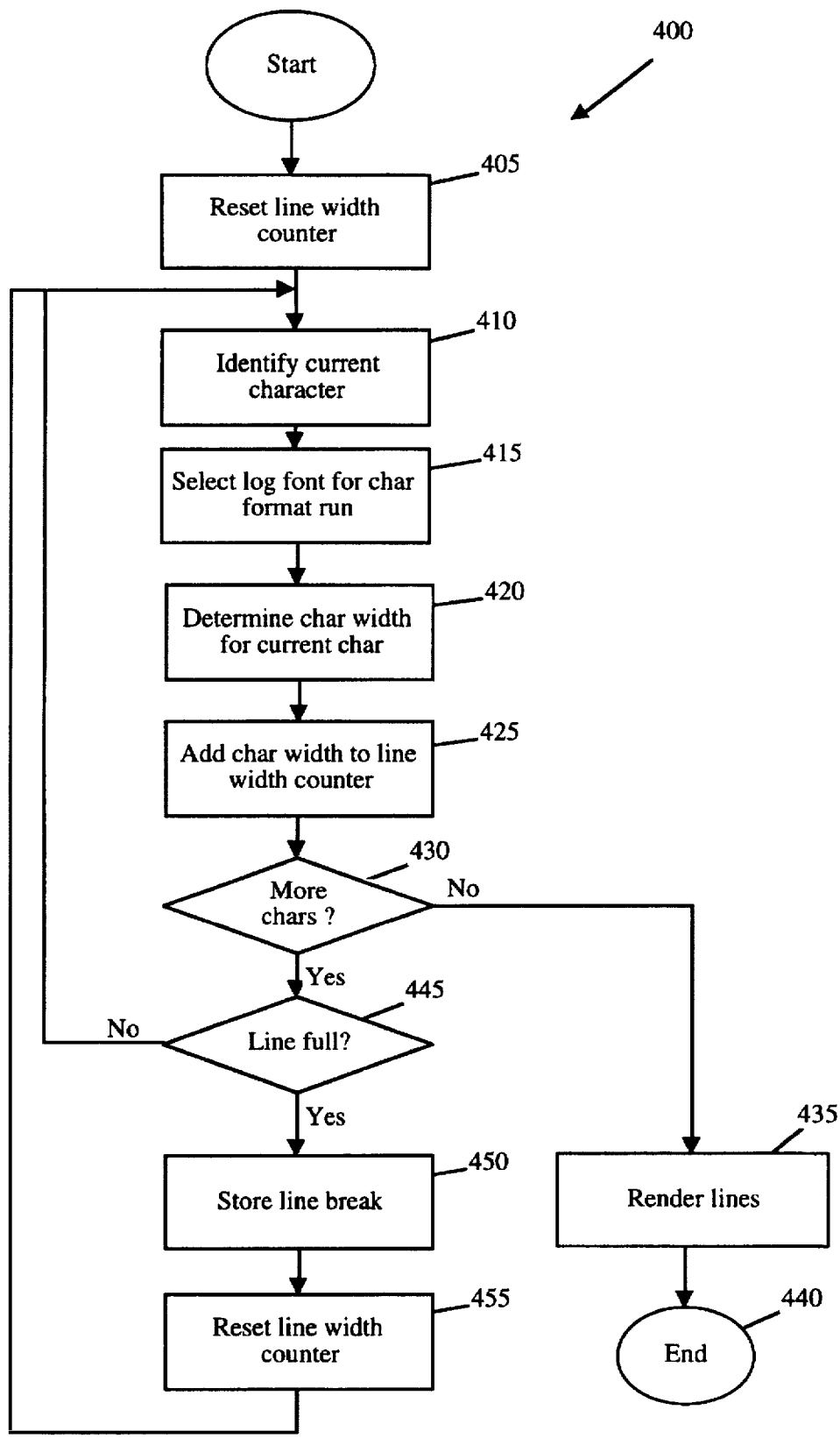
FIG. 4 is a flow diagram illustrating a method performed by an application program for measuring line breaks for displaying character strings.

FIG. 4 is a flow diagram illustrating a line measuring routine 400 in which the method of the present invention is used. Generally, the line measuring routine 400 is operative to determine how to separate characters in a character string into lines and to draw or render the text once the line breaks are determined. Those skilled in the art will understand that the routine 400 is carried out by an application program such as a word processor, which has the responsibility for storing and displaying text.

The measuring routine 400 determines the location of line breaks by sequentially adding each character's width until the cumulative width value exceeds the width of the line. At that point, the routine stores the line break and begins to measure the next line.

The routine 400 begins at step 405 by resetting the line width counter, which is used to store the cumulative width of the characters on the line. At step 410 the routine identifies the current character from the text stored in the backing store. At step 415 the routine refers to the appropriate character format run in order to determine the logical font for the current character and then selects the logical font into the output device's display context.

At step 420 the routine 400 determines the width of the current character by calling the routine that embodies the present invention. In the preferred embodiment, the font width cache is implemented as a subroutine that is called at this point. The subroutine returns the width of the current character. Generally, the subroutine 420 first determines whether the cache corresponding to the current realized font contains the width of the current character. If so, the width is returned to the calling routine. If not, the subroutine calls the appropriate operating system function in order to obtain the width data. The subroutine is described in more detail in conjunction with FIGS. 5 and 6.

After the subroutine 420 returns the width of the current character the routine 400 proceeds to step 425. At this step, the width of the current character is added to the current value of the line width counter.

At step 430 the routine determines whether there are additional characters to measure. If not, the routine goes to step 435 and renders or draws the text by making the appropriate operating system calls and providing the needed parameters. The routine terminates at step 440

If there are more characters to measure at step 430, the routine 400 proceeds to step 445 and determines whether the current line is full. This is determined by checking to see if the line width counter has overflowed. If not, the routine returns to step 410 where it identifies the next character whose width needs to be determined.

If the routine determines that the line is full at step 445 the routine proceeds to step 450 and stores a line break. In the preferred system, this involves storing the character position of the first character on the line and the width of the line. Once these values are stored, the routine proceeds to step 455 and resets the line width counter in order to prepare to calculate the next line. From there, the routine returns to step 410.

Figure 5A:
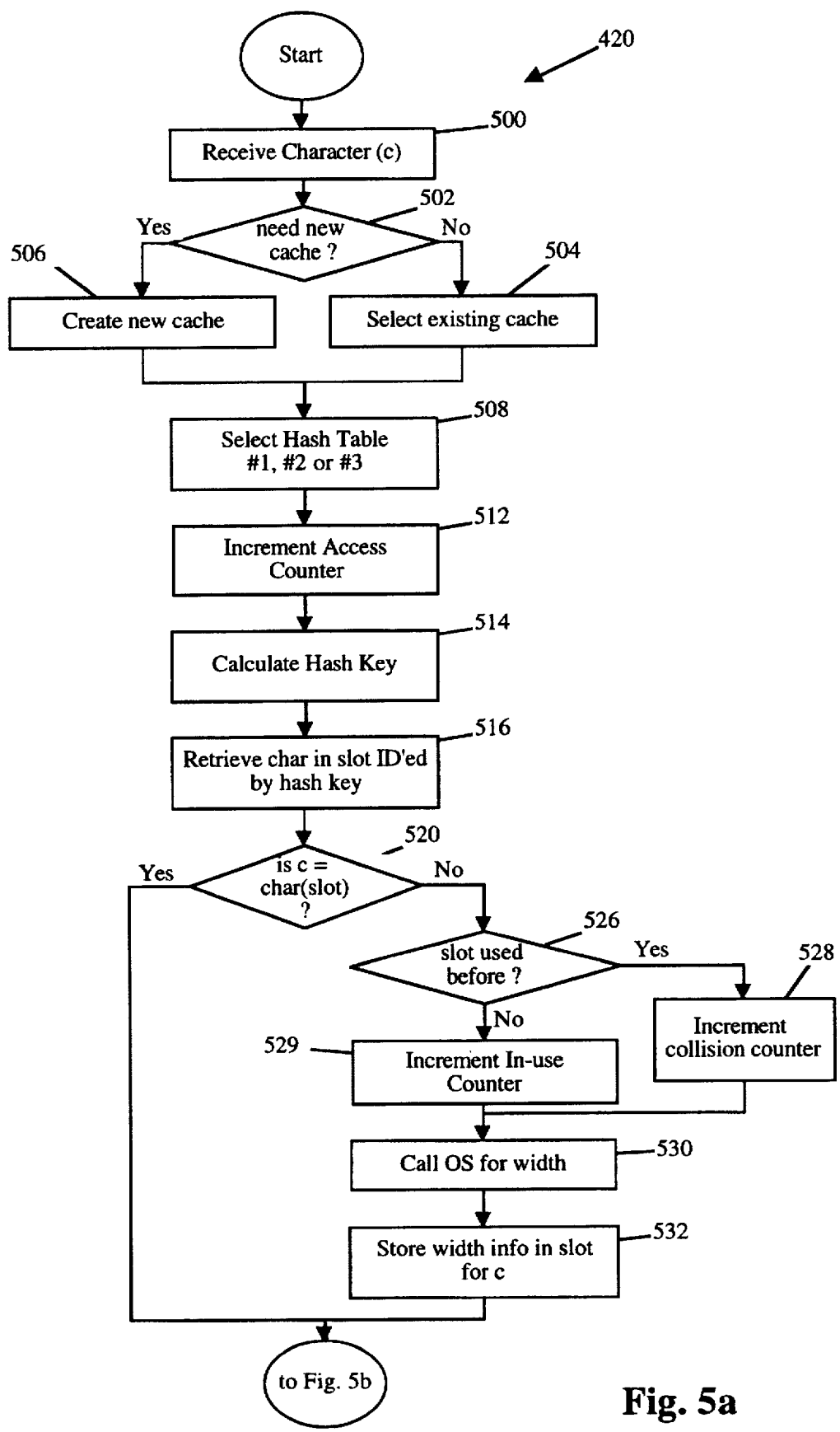
FIGS. 5a and 5b, are flow diagrams illustrating a method of operating a self-optimizing font width cache constructed in accordance with the present invention.
Figure 5B:
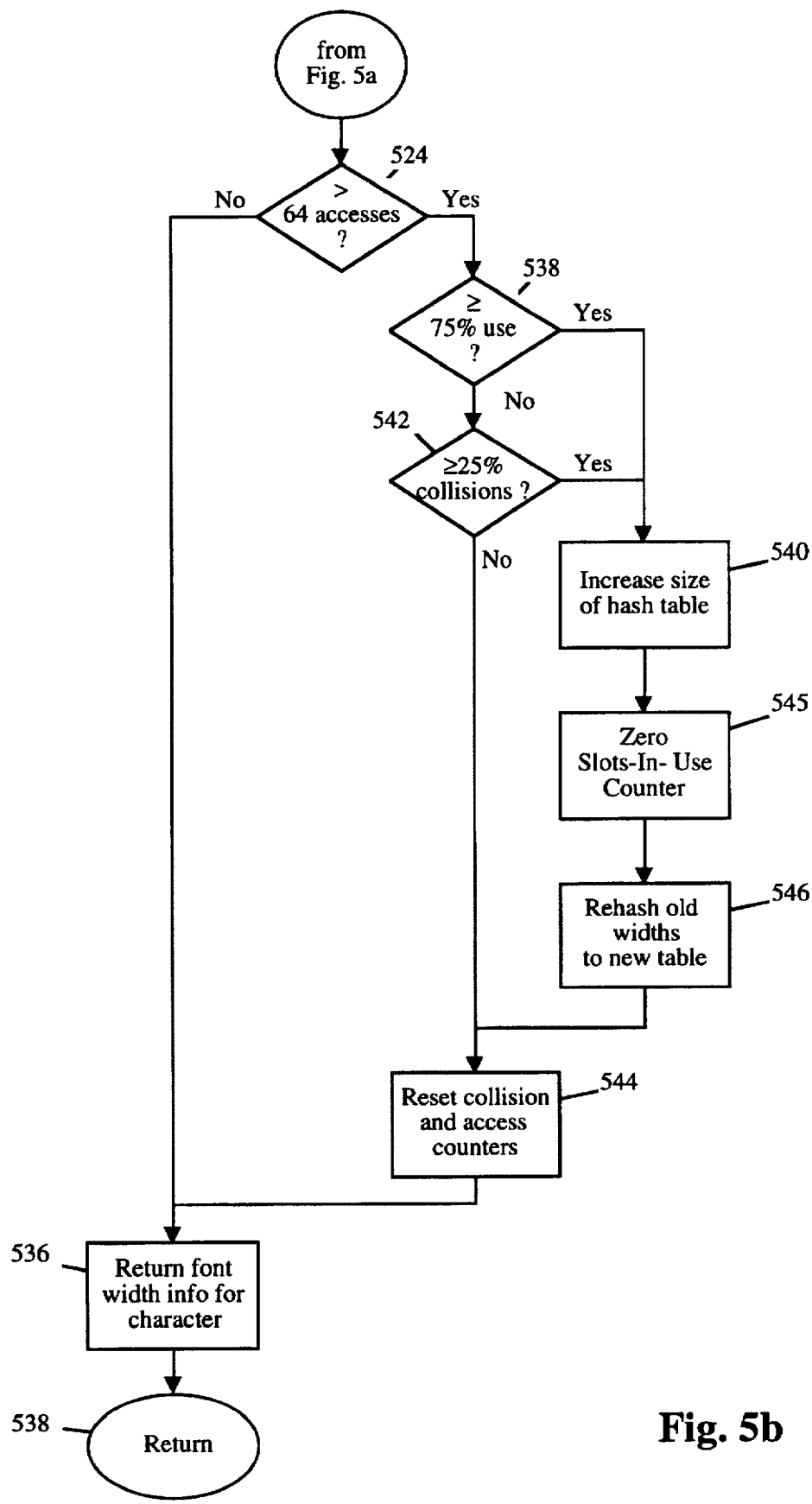

FIGS. 5a and 5b, are flow diagrams that illustrate the method 420 for providing font widths in accordance with the present invention. The method 420 forms a part of the method 400 of FIG. 4 and acts as a font width server. This embodiment of the present invention is implemented as a module that is called by the application program. The module is compiled into the application program.

At step 500, the method 420 receives the character code for the current character, which was read from the backing store by the application program. At step 502 the method determines whether a font width cache for the current font realization already exists. As mentioned above, the preferred embodiment provides a separate font width cache for each font realization, up to a maximum of 16 font width caches. If a font width cache already exists for this realization, the method goes to step 504 and selects the proper font width cache. If there is no existing cache for the current font realization, the method goes to step 506 where it creates and initializes a new cache that includes three (3) hash tables, with each hash table having only one (1) slot. When a table is initiated, the slots-in-use counter is cleared in order to indicate that none of the slots are yet used. From step 504 or step 506 the method proceeds to step 508.

At step 508 the method selects the hash table that is associated with the character code of the current character. As described above, each font width cache includes three hash tables, which correspond to the upper, middle and lower Unicode subranges. Each hash table in each font width cache grows independently according to the demands placed on it by the data in the document that is being displayed. The proper hash table is selected at step 508 by determining whether the character code of the current character fall in the lower range (U+0000→U+4DFF hex), middle range (U+4E00→U+ABFF hex), or upper range (U+AC00→U+FFFF hex) of the Unicode character set. The method selects hash table #1, hash table #2, or hash table #3, depending on whether the character code of the current character falls in the lower range, middle range, or upper range, respectively.

Figure 6:
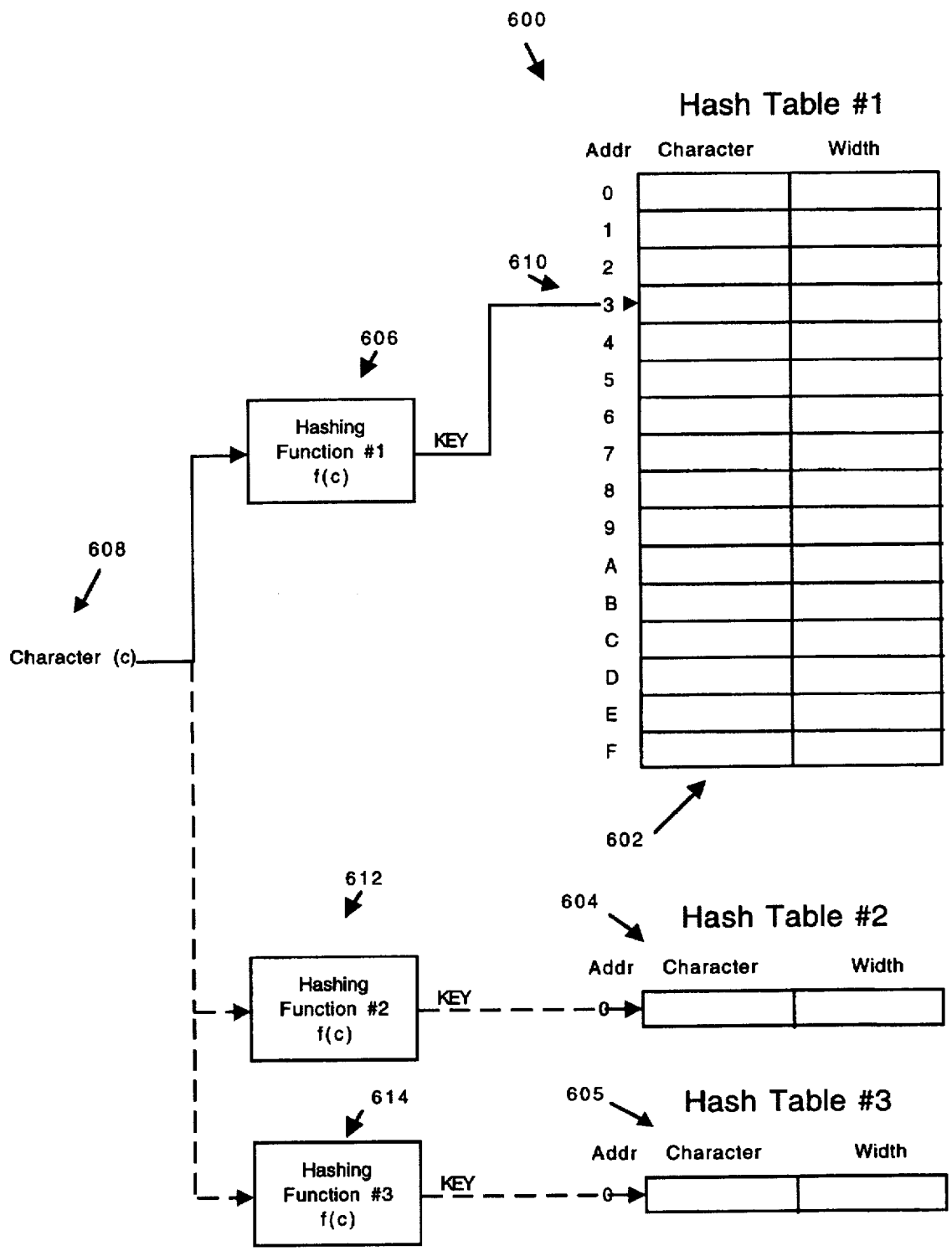
FIG. 6 is a diagram illustrating the use of a hashing function to map a character key to a slot in a hash table.

FIG. 6 illustrates the configuration of the hash tables employed in each font width cache of the present invention. Each font width cache 600 includes three hash tables, hash table #1 602, hash table #2 604, and hash table #3 605. Each slot in a hash table provides space for storing a character code and the width of the corresponding character. Referring now to FIG. 6, hash table #1 602 is associated with characters in the lower Unicode range (U+0000→U+4DFF hex). Hash table #2 604 is associated with characters in the middle Unicode range (U+4E00→ABFF hex). Hash table #3 605 is associated with characters in the upper Unicode range (U+AC00→U+FFFF hex). In the illustration of FIG. 6, it is assumed that the current character 608 falls in the lower range, and that hash table #1 602 has grown to 16 slots while hash table #2 604 and hash table #3 605 have only 1 slot each. This is the case with hash table #2 and hash table #3 in documents that contain only western phonetic characters, which fall in the lower Unicode range.

As described above, hashing is an indexing technique in which a numerical function known as a hashing function is applied to the value of an input element. Hash tables are often used to minimize the amount of memory used by a data cache in cases where only a small number of elements from a given set of data may actually be required to perform an operation. In the present case, the number of slots for each hash table is less than the number of characters associated with the Unicode range that corresponds to the hash table. Therefore, the hashing function maps many characters to a single slot.

In the present case, the input element 608 is the character code of the current character. Each hash table in the font width cache 600 is associated with a separate hashing function. Hashing function #1 606 is associated with hash table #1 602, hashing function #2 612 is associated with hash table #2, and hashing function #3 614 is associated with hash table #3 605. In the present example, the output of the hashing function #1 606 is a hash key, which identifies the location or slot 610 in hash table #1 602 where the corresponding piece of information can be found.

The present invention attempts to reduce collisions by utilizing the characteristics of the data, namely by providing separate hash tables for the lower, middle and upper ranges of the Unicode character set. Although the preferred embodiment corresponds to the Unicode character set, those skilled in the art will appreciate that the number and allocation of hash tables can be varied depending on the nature of the character set being considered and the specific subranges associated therewith.

In the preferred embodiment, the hashing function consists of logically ANDing the character code of the current character with a value equal to one less than the current size (i.e., the number of slots) of the selected hash table. This value will always be of the form $(2^n-1)$, where n is an integer. Initially, each table begins with only one slot. As explained below, a hash table can be dynamically expanded. Therefore, if the selected hash table has 16 slots (as illustrated in FIG. 6), the 16-bit value of the character code for the current character will be logically ANDed with the binary value 1111, which equals 15. The result of the logical AND function forms the hash key, which points to one of the 16 slots in the table. The logical AND function is chosen because it may be executed very quickly and efficiently by the microprocessor. The process of resizing the hash table is described in more detail below.

Returning now to FIG. 5a, from step 508 the method proceeds to step 512 where it increments an access counter for the selected hash table. This access counter is used to keep track of how many times each hash table is accessed.

At step 514 the method calculates the hash key that will be used to access the selected hash table. This is accomplished by applying a hashing function to the character code of the current character. In the preferred system, the hashing function is defined as logically ANDing the 16-bit character code of the current character with a value equal to one less than the current size of the corresponding hash table. As mentioned above, this value will always be of the form $(2^n-1)$, where n is an integer.

At step 516 the method retrieves the character code that is stored in the hash table slot identified by the hash key. At step 520 the method determines whether the retrieved character code corresponds to the current character code, which was provided to the routine 420 at step 500. If so, this indicates that the font width for this character has been previously calculated and stored in the hash table. In this case, the method proceeds to step 524 and begins the process of evaluating the statistics associated with the current hash table and determining whether the demands placed on the hash table by the system indicates that the size of the hash table should be increased. This statistical evaluation will be described below.

Returning to step 520, if the character retrieved from the hash table does not correspond to the character provided by the application program at step 500 the method proceeds to step 526. If the retrieved character does not match, it indicates a possible collision, which would occur if the current character (from step 500) has been mapped into a slot that was already used to store the width for another character. Alternatively, the slot may not have been used yet. When this is the case, there is no collision. At step 526 the method determines whether the slot was used before. This is accomplished by reading the width data stored in the slot. If the width is zero, the slot has not been used. If the width is a non-zero value, the slot has been used to store the width of another character and there is a collision. In this case, the method proceeds to step 528 and increments a collision counter before proceeding to step 530.

If the slot has not been used, the method proceeds to step 529 and increments a slots-in-use counter, which indicates the number of slots in the hash table that are currently in use. The slots-in-use counter is maintained for the purpose of evaluating the performance of the hash table, which is described in more detail below. From step 529 the method proceeds to step 530.

At step 530, the method obtains the font width for the current character by calling the appropriate operating system function. In the preferred system, the GetCharWidth function is used to obtain the font width for the current character. Those skilled in the art will understand that when the application is compiled with the UNICODE preprocessor macro option defined, the GetCharWidth function is mapped by the compiler to the GetCharWidthW function, which is compatible with 16-bit (wide) Unicode characters.

At step 532 the font width value returned by the operating system is stored in the hash table slot identified by the hash key calculated at step 516. The character code for the current character is also stored in the hash table. If the slot had not been used before, this process simply stores the character code and font width in the hash table. If the slot had been used, this process overwrites the old value with the value of the current character and its associated font width. From step 532 the method proceeds to step 524.

At step 524 (FIG. 5b) the method begins the process of evaluating the statistics associated with the current hash table and determining whether the demands placed on the hash table by the data being displayed indicates that the size of the hash table should be increased in order to improve efficiency. Independent statistics, including the number of slots in use, the number of accesses, and the number of collisions, are maintained and updated every time a hash table is accessed. These statistics are used to determine how well the hash table is performing and to decide whether to increase the number of slots in the hash table. If the size of a hash table is increased, all of the data from the old, smaller hash table is copied into the new hash table after the character code is rehashed using the hashing function for the new hash table. This rehashing process is necessary because the hashing function varies with the number of slots in the hash table. In addition, the slots-in-use counter must be set to reflect the number of slots in use.

In the present system, two criteria are measured in order to determine whether to increase the size of the hash table. The first criteria is based on the number of slots that are in use, and will cause the size of a hash table to be increased if more than 75% of the slots in the hash table are used. The second criteria is based on the percentage of accesses that result in collisions, and will cause the size of the hash table to increase if at least 25% of all accesses to that hash table have resulted in collisions. As will be apparent in light of the explanation that follows, the threshold values may be varied in order to provide the level of performance desired. However, the preferred thresholds were chosen in order to greatly simplify calculations and improve the efficiency of the statistical analysis. The calculations are also simplified by performing this analysis after every 64 accesses to a hash table.

The first step in the performance evaluation process is step 524. At this step, the method determines whether the current hash table has been accessed 64 times since the last statistical evaluation. If not, the method proceeds to step 536 where it returns the proper font width value to the main method 400 (FIG. 4). The returned value will have been retrieved from the slot in the table or provided by the operating system. At step 538, the method 420 returns to the main method 400 (FIG. 4).

At step 524, if the hash table has been accessed 64 times the method proceeds to step 538. At step 538, the method uses the slots-in-use counter to determine whether more than 75% of the slots in the current hash table are in use. If so, the method goes to step 540 and increases the size of the hash table. If not, the method goes to step 542 and determines whether at least 25% of the accesses to the current hash table have resulted in collisions.

The specific process conducted in conjunction with step 542 will now be described. Generally, the percentage of collisions may be calculated by applying the following inequality, which corresponds to the preferred collision threshold of 25%:

$$(\text{Collisions/Accesses}) \geq 0.25$$

Although the microprocessor in the preferred system is capable of performing these calculations, the calculations are simplified by performing the assessment after 64 accesses. By rewriting 0.25 as the fraction 2/8, performing the assessment after 64 accesses, and replacing the constant 64 for the variable Accesses, the inequality becomes:

$$(\text{Collisions}/64) \geq 2/8$$

This inequality may be rewritten as:

$$(\text{Collisions}/8) \geq 2$$

Those skilled in the art will appreciate that microprocessors, such as the PENTIUM microprocessor in the preferred system, can easily multiply or divide by powers of two by shifting binary values to the left or right. Shifting a binary value is much faster than performing true multiplication or division. In the present system, the microprocessor effectively divides the number of collisions by 8 by shifting the binary value for the collisions to the right by three bits. For example, if the number of collisions is 23 (10111 binary), the shift to the right by three bits results in 10 binary, which is equal to 2 decimal. This would result in the inequality being true, which would properly indicate that the percentage of collisions, for 64 accesses, was at least 25%. Those skilled in the art will appreciate that the threshold percentage and the number of accesses between statistical analyses can be varied to provide different resolutions.

If, at step 542, the percentage of collisions is at least 25%, the method goes to step 540 and increases the size of the hash table. If not, the method goes to step 544 where it resets the collision and access counters. From step 544 the method goes to step 536 where it returns the font width value to the main method 400 (FIG. 4). At step 538, the method 400 returns to the main method 400 (FIG. 4).

At step 540 the method increases the size of the hash table. In the preferred system, the first increase is from one (1) slot to eight (8) slots. For each subsequent increase in the size of a hash table, the number of slots is doubled. Therefore, the size of the hash table will be of the form $2^n$, where n is an integer. Each hash table starts out with one slot and, if necessary, increases to eight (8) slots, and then grows by powers of two up to predetermined maximums. In the preferred system, the hash table associated with the Unicode character codes in the lower range (U+0000→U+4DFF hex) can grow to a maximum of 256 slots. The hash tables associated with the Unicode character codes in the middle range (U+4E00→U+ABFF hex) and upper range (U+AC00→U+FFFF hex) can each grow to a maximum of 512 slots. Once the maximum number of slots is reached, the routine no longer keeps statistics on that hash table.

Those skilled in the art will appreciate that the prior art teaches that the size of hash tables that use the division technique for a hashing function should not be near a power of two because this would prevent normal distribution of keys across all of the slots in the table. However, because of the nature of the data that is hashed, namely single characters with equal probability, this rule of thumb is ignored.

Once the new, larger hash table is created at step 540, the slots-in-use counter is zeroed at step 545 and the data from the old, smaller hash table is rehashed using the hashing function for the new hash table and stored in the new table at step 546. The process of rehashing is necessary because the hashing function varies according to the size of the hash table (i.e., it is one less than the size of the hash table). In the preferred system, each character code stored in the old hash table is manipulated with the new hashing function. The character code and font width are then stored in the new table in the slot that corresponds to the new hash key. The slots-in-use counter for the new hash table is set to reflect the number of slots currently in use.

After the data is rehashed and copied to the new hash table, the method proceeds to step 544 and resets the access and collision counters. From there, the method returns the font width value at step 536 and returns to the main routine 400 (FIG. 4) at step 538.

Those skilled in the art will appreciate that by providing dynamic expansion, each hash table can grow to suit the demands placed on it. By starting each hash table with one (1) slot and allowing it to grow, the present invention allows the performance of the hash table to approach 100% (i.e., no collisions) while using a minimum amount of memory. The system reaches a "steady state" when the performance criteria no longer require the size of the hash table to be increased. If a hash table does not reach a steady state, memory usage is constrained by an upper limit on expansion. When a hash table reaches its upper limit, there is no need to maintain additional statistics for that hash table.

The present inventor believes the overall performance of the font width cache can be improved by slightly modifying the method depicted in FIGS. 5a and 5b. In particular, the present inventor has determined that the method may be optimized by not evaluating the hash table statistics when the needed data is available in the hash table. In the context of FIGS. 5a and 5b, this modification would result in proceeding directly from the "YES" branch of step 520 to step 536 without evaluating the statistics (step 524).

By evaluating the statistics only after a collision or possible collision, the calculations described may be performed after more than 64 accesses. In this case, the calculations would not provide the accurate collision ratio. However, this modification still provides a qualitative feel for the demands of the user data.

The downside of this modification is that the size of a hash table may be expanded unnecessarily. For example, if 15 or more collisions are followed by 1000 successful accesses, and then by 1 collision, the calculations at step 542 will determine that the collision rate exceeds 25% (although 16/1000 does not equal 25%).

However, the present inventor believes that the probability of an unnecessary expansion is low because of the average rate of collisions. If the collision rate is actually 25%, one out of every four accesses will result in a collision. So, even if the method does not examine the statistics after exactly 64 accesses, the method would examine the statistics at about 68 accesses. In this example, 68 is close enough to 64 that the calculation performed at step 542 is still sufficiently accurate to determine if an expansion is indicated. Although the collision rate calculation is no longer precise, the present inventor believes that the risk of an unnecessary expansion is greatly outweighed by the speed increase that results from skipping the statistics after successful accesses.

The advantages of the present invention are illustrated by an example. If a document has only a few superscripted footnote reference numbers (i.e., a particular font realization), there will be a separate cache for that font realization. However, the hash table containing the widths for characters in the lower range (U+0000→U+4DFF hex) will probably not exceed 8 slots. In addition, because the hash tables associated with the middle and upper character code ranges are not used in this example, they remain at only one (1) slot each. Those skilled in the art will appreciate that this approach is a vast improvement over the prior art, which provides a large table for each font realization regardless of the number of characters used from that realized font.

In a test system constructed according to the present invention, a sample Japanese document containing 300K characters provided the following statistics. The test system included two hash tables. A lower hash table was associated with the phonetic characters in range U+0000→U+3FFF hex. . An upper hash table was associated with the CJK ideographic characters in range U+4000→U+FFFF hex. The upper and lower hash tables went to their predetermined maximums of 256 and 512, respectively. This makes the maximum memory used by the cache only 4660 bytes. Those skilled in the art will appreciate that the amount of memory can be further reduced by compressing or packing the data. In the present example, the required memory can be reduced to 3100 bytes if packed data is used. Once the size of the lower and upper hash tables increased to their maximums, the lower hash table in this example experienced a collision rate of less than 4%. The upper hash table experienced a collision rate of less than 22%. The combined collision rate was less than 8%. So, for any given character in the sample document, there was an 8% chance that a collision would have to be resolved. This is an improvement over using a single hash table and equivalent hashing function with 768 slots.

Those skilled in the art will also appreciate that the optimum maximum size for each hash table can be determined empirically by analyzing a variety of documents while trying a variety of maximum sizes. Although the number of collisions in the middle and upper ranges approaches zero as the size of the corresponding hash tables approaches 24,064 and 21,504, respectively, the present inventor has determined that increasing the maximum size from 512 to 1024 does not result in significantly fewer collisions. Therefore, the maximum of 512 slots was chosen in order to minimize overall memory usage.

From the foregoing description, it will be appreciated that the present invention provides an efficient font width cache for providing font widths to an application program. The font width cache acts as a font width server which services requests for widths for any given character. The operation of the present invention is straightforward and maintains good system performance by minimizing the number of calls to the operating system. The present invention accomplishes this without requiring an inordinate amount of memory.

The foregoing method of the present invention may conveniently be implemented in a program module that is based upon the flow charts in FIGS. 4 and 5a–5b. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

The present invention has been described in relation to particular embodiments which are intended in all respects to be illustrative rather than restrictive. For example, although the present invention has been described in conjunction with providing the widths of characters in conjunction with a particular character set, those skilled in the art will understand that the principles of the present invention may be applied to provide other font-related properties or metrics associated with individual or pairs of characters.

Furthermore, variations of the invention may be used any time a lookup or computation is required to obtain a result and the input to the computation or lookup is repeated more than once.

Similarly, the present invention has been described as providing three dynamically expandable hash tables in conjunction with the Unicode character set, which includes three primary subranges. However, those skilled in the art will appreciate that the principles and features of the present are not limited to the Unicode character set or to character sets having three primary subranges. For example, dynamically expandable hash tables are useful regardless of the number of hash tables employed. Similarly, the number of hash tables in each cache may be varied depending on the number and nature of the subranges within a character set.

Furthermore, although the present invention has been described in conjunction with a 16-bit character set, the principles of the present invention may be applied to character sets that employ different size character codes. For example, the present invention may be extended to 32-bit character codes, such as the ISO 10646 UCS-4 standard, which is published by the International Standards Organization.

In summary, the font properties cache of the present invention has the potential to be utilized in any product, including application programs (e.g., word processors, desktop publishing, World Wide Web browsers, etc.) and operating system software, that must display or layout multiline text or rich text.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for providing a dynamically expandable cache for storing data associated with elements, comprising the steps of:

providing a hash table for storing said data, said hash table including n slots for storing said data for up to n of said elements;

applying a hashing function to a code corresponding to a selected element, said hashing function providing a hash key identifying a selected slot in said hash table;

determining whether said data corresponding to said selected element is stored in said selected slot in said hash table;

if said data corresponding to said selected element is stored in said selected slot, retrieving said data corresponding to said selected element, otherwise, obtaining said data corresponding to said selected element and storing said data in said hash table;

determining whether the performance of said hash table falls below a predetermined threshold; and increasing, if said performance falls below said predetermined threshold, the number of slots in said hash table.

2. A method for providing a dynamically expandable cache as recited in claim 1, wherein said elements comprise characters and said data comprises character width data corresponding to said characters.

3. A method for providing a dynamically expandable cache as recited in claim 1, wherein applying said hashing function comprises logically ANDing said code with a number equal to one less than the number of slots in said hash table.

4. A method for providing a dynamically expandable cache as recited in claim 1, wherein said hash table also includes the codes corresponding to elements whose data is stored in said slots, and wherein determining whether said data corresponding to said selected element is stored in said selected slot comprises the steps of:

retrieving the code corresponding to the slot identified by said hash key; and comparing said retrieved code to the code corresponding to said selected element.

5. A method for providing a dynamically expandable cache as recited in claim 1, wherein retrieving said data comprises reading said data from the slot identified by said hash key.

6. A method for providing a dynamically expandable cache as recited in claim 1, wherein obtaining said data comprises calling an operating system function for providing said data.

7. A method for providing a dynamically expandable cache as recited in claim 1, wherein determining whether the performance of said hash table falls below said predetermined threshold comprises determining whether a predetermined percentage of the slots in said hash table are being used.

8. A method for providing a dynamically expandable cache as recited in claim 1, wherein determining whether the performance of said hash table falls below said predetermined threshold comprises determining whether a predetermined percentage of accesses to said hash table result in collisions.

9. A method for providing a dynamically expandable cache as recited in claim 8, wherein one of the collisions occurs when said slot identified by said hash key contains data corresponding to an element other than said selected element.

10. A method for providing a dynamically expandable cache as recited in claim 1, wherein increasing the number of slots in said hash table comprises creating a hash table having 2n slots and rehashing and storing said data from said n slots into said 2n slots.

11. A method for providing a dynamically expandable cache as recited in claim 1, wherein n is a power of 2.

12. A method for providing a memory cache for storing data associated with an element set having first and second element code subranges, comprising the steps of:

providing a plurality of hash tables including a first hash table for storing data corresponding to elements in said first element code subrange and a second hash table for storing data corresponding to elements in said second element code subrange;

receiving an element code corresponding to a selected element;

selecting said first hash table if said element code corresponds to said first element code subrange;

selecting said second hash table if said element code corresponds to said second element code subrange;

applying a hashing function to said element code, said hashing function providing a hash key identifying a selected slot in said selected hash table;

determining whether said data corresponding to said selected element is stored in said selected slot in said selected hash table; and if said data corresponding to said selected element is stored in said selected slot, retrieving said data corresponding to said selected element, otherwise, obtaining said data corresponding to said selected element and storing said data in said selected hash table.

13. A method for providing a memory cache as recited in claim 12, wherein said element set comprises a character set and said data comprises character width data.

14. A method for providing a memory cache as recited in claim 12, wherein applying said hashing function comprises logically ANDing said element code with a number equal to one less than the number of slots in said selected hash table.

15. A method for providing a memory cache as recited in claim 12, wherein said selected hash table also includes the element codes of the elements whose data is stored in said slots, and wherein determining whether said data corresponding to said selected element is stored in said selected slot comprises the steps of:

retrieving the element code corresponding to the slot identified by said hash key; and comparing said retrieved element code to the element code corresponding to said selected element.

16. A method for providing a memory cache as recited in claim 12, wherein retrieving said data comprises reading said data from the slot identified by said hash key.

17. A method for providing a memory cache as recited in claim 12, wherein obtaining said data comprises calling an operating system function for providing said data.

18. A method for providing a memory cache as recited in claim 12, further comprising the steps of:

determining whether the performance of said selected hash table falls below a predetermined threshold; and increasing, if said performance falls below said predetermined threshold, the number of slots in said selected hash table.

19. A method for providing a memory cache as recited in claim 18, wherein determining whether the performance of said selected hash table falls below said predetermined threshold comprises determining whether a predetermined percentage of the slots in said selected hash table are being used.

20. A method for providing a memory cache as recited in claim 18, wherein determining whether the performance of said selected hash table falls below said predetermined threshold comprises determining whether a predetermined percentage of accesses to said selected hash table result in collisions.

21. A method for providing a memory cache as recited in claim 18, wherein increasing the number of slots in said selected hash table comprises creating a selected hash table having 2n slots and rehashing and storing the data from said n slots into said 2n slots.

22. A method for providing a dynamically expandable memory cache for an element set having first and second element code subranges, comprising the steps of:

providing a first hash table for storing data corresponding to elements in said first element code subrange;

providing a second hash table for storing data corresponding to elements in said second element code subrange;

receiving an element code corresponding to a selected element;

selecting said first hash table if said element code corresponds to said first element code subrange;

selecting said second hash table if said element code corresponds to said second element code subrange;

applying a hashing function to said element code, said hashing function providing a hash key identifying a selected slot in said selected hash table;

determining whether said data corresponding to said selected element is stored in said selected slot in said selected hash table;

if said data corresponding to said selected element is stored in said selected slot, retrieving said data corresponding to said selected element, otherwise, obtaining said data corresponding to said selected element and storing said data in said selected hash table;

determining whether the performance of said selected hash table falls below a predetermined threshold; and increasing, if said performance falls below said predetermined threshold, the number of slots in said selected hash table.

23. A method for providing a dynamically expandable memory cache as recited in claim 22, wherein said element set comprises a character set and said data comprises character width data.

24. A method for providing a dynamically expandable memory cache as recited in claim 22, wherein applying said hashing function comprises logically ANDing said element code with a number equal to one less than the number of slots in said selected hash table.

25. A method for providing a dynamically expandable memory cache as recited in claim 22, wherein said selected hash table also includes the element code of the elements whose data is stored in said slots, and wherein determining whether said data corresponding to said selected element is stored in said selected slot comprises the steps of:

retrieving the element code corresponding to the slot identified by said hash key; and comparing said retrieved element code to the element code corresponding to said selected element.

26. A method for providing a dynamically expandable memory cache as recited in claim 22, wherein retrieving said data comprises reading said data from the slot identified by said hash key.

27. A method for providing a dynamically expandable memory cache as recited in claim 22, wherein obtaining said data comprises calling a function for providing said data.

28. A method for providing a dynamically expandable memory cache as recited in claim 22, wherein determining whether the performance of said selected hash table falls below said predetermined threshold comprises determining whether a predetermined percentage of the slots in said selected hash table are being used or whether a predetermined percentage of accesses to said selected hash table result in collisions.

29. A method for providing a dynamically expandable memory cache as recited in claim 22, wherein increasing the number of slots in said selected hash table comprises creating a selected hash table having 2n slots and rehashing and storing the data from said n slots into said 2n slots.

30. In a computer system having memory, a font, and an operating system, a dynamically expandable font property memory cache for a character set having first and second character code subranges, comprising:

a central processing unit (CPU) connected to said memory;

said CPU being operative to:

provide a plurality of hash tables in said memory including a first hash table for storing font properties corresponding to characters in said first character code subrange and a second hash table for storing font properties corresponding to characters in said second character code subrange;

receive a character code corresponding to a selected character;

select said first hash table if said character code corresponds to said first character code subrange;

select said second hash table if said character code corresponds to said second character code subrange;

apply a hashing function to said character code, said hashing function providing a hash key identifying a selected slot in said selected hash table;

determine whether said font property corresponding to said selected character is stored in said selected slot in said selected hash table;

if said data corresponding to said selected character is stored in said selected slot, retrieve said font property corresponding to said selected character, otherwise, obtain said font property corresponding to said selected character and storing said font property in said selected hash table;

determine whether the performance of said selected hash table falls below a predetermined threshold; and increase, if said performance falls below said predetermined threshold, the number of slots in said selected hash table.

31. A dynamically expandable font property memory cache as recited in claim 30, wherein said CPU applies said hashing function by logically ANDing said character code with a number equal to one less than the number of slots in said selected hash table.

32. A dynamically expandable font property memory cache as recited in claim 30, wherein said selected hash table also includes the character code of the characters whose font property is stored in said slots, and wherein said CPU determines whether said font property corresponding to said selected character is stored in said selected slot by:

retrieving the character code corresponding to the slot identified by said hash key; and comparing said retrieved character code to the character code corresponding to said selected character.

33. A dynamically expandable font property memory cache as recited in claim 30, wherein said CPU obtains said font property by performing an operating system function for providing said font property.

34. A dynamically expandable font property memory cache as recited in claim 30, wherein said CPU determines the performance of said selected hash table by determining whether a predetermined percentage of the slots in said selected hash table are being used.

35. A dynamically expandable font property memory cache as recited in claim 30, wherein said CPU determines the performance of said selected hash table by determining whether a predetermined percentage of accesses to said selected hash table result in collisions.

36. A dynamically expandable font property memory cache as recited in claim 30, wherein said CPU increases the number of slots in said selected hash table by creating a hash table having 2n slots and rehashing and storing the data from said n slots into said 2n slots.

37. A computer-readable medium on which is stored a computer program for operating a dynamically expandable memory cache for an element set having first and second element code subranges, said computer program comprising instructions which, when executed by a computer, perform the steps of:

providing a plurality of hash tables including a first hash table for storing font properties corresponding to elements in said first element code subrange and a second hash table for storing font properties corresponding to elements in said second element code subrange;

receiving an element code corresponding to a selected element;

selecting said first hash table if said element code corresponds to said first element code subrange;

selecting said second hash table if said element code corresponds to said second element code subrange;

applying a hashing function to said element code; said hashing function providing a hash key identifying a selected slot in said selected hash table;

determining whether said data corresponding to said selected element is stored in said selected slot in said selected hash table;

if said data corresponding to said selected element is stored in said selected slot, retrieving said data corresponding to said selected element, otherwise, obtaining said data corresponding to said selected element and storing said data in said selected hash table;

determining whether the performance of said selected hash table falls below a predetermined threshold; and increasing, if said performance falls below said predetermined threshold, the number of slots in said selected hash table.

38. A computer-readable medium as recited in claim 37, wherein said element set comprises a character set and said data comprises character width data.

39. A computer-readable medium as recited in claim 37, wherein said steps performed by said program further comprise applying said hashing function comprises logically ANDing said element code with a number equal to one less than the number of slots in said selected hash table.

40. A computer-readable medium as recited in claim 37, wherein said selected hash table also includes the element code of the elements whose data is stored in said slots, and wherein determining whether said data corresponding to said selected element is stored in said selected slot comprises the steps of:

retrieving the element code corresponding to the slot identified by said hash key; and comparing said retrieved element code to the element code corresponding to said selected element.

41. A computer-readable medium as recited in claim 37, wherein determining whether the performance of said selected hash table falls below said predetermined threshold comprises determining whether a predetermined percentage of the slots in said selected hash table are being used.

42. A computer-readable medium as recited in claim 37, wherein determining whether the performance of said selected hash table falls below said predetermined threshold comprises determining whether a predetermined percentage of accesses to said selected hash table result in collisions.

43. A computer-readable medium as recited in claim 37, wherein increasing the number of slots in said selected hash table comprises increasing the number of slots from n to 2n and rehashing and storing the data from said n slots into said 2n slots.

44. A computer-readable medium on which is stored a computer program for operating a dynamically expandable memory cache for storing data associated with an element set, said computer program comprising instructions which, when executed by a computer, perform the steps of:

providing a hash table for storing said data, said hash table including n slots for storing said data;

receiving an element code corresponding to a selected element;

applying a hashing function to said element code; said hashing function providing a hash key identifying a selected slot in said hash table;

determining whether said data corresponding to said selected element is stored in said selected slot in said hash table;

if said data corresponding to said selected element is stored in said selected slot, retrieving said data corresponding to said selected element, otherwise, obtaining said data corresponding to said selected element and storing said data in said hash table;

determining whether the performance of said hash table falls below a predetermined threshold; and increasing, if said performance falls below said predetermined threshold, the number of slots in said hash table.

45. A computer-readable medium as recited in claim 44, wherein said element set comprises a character set and said data comprises character width data.

46. A computer-readable medium as recited in claim 44, wherein said steps performed by said program further comprise applying said hashing function comprises logically ANDing said element code with a number equal to one less than the number of slots in said hash table.

47. A computer-readable medium as recited in claim 44, wherein said hash table also includes the element code of the elements whose data is stored in said slots, and wherein determining whether said data corresponding to said selected element is stored in said selected slot comprises the steps of:

retrieving the element code corresponding to the slot identified by said hash key; and comparing said retrieved element code to the element code corresponding to said selected element.

48. A computer-readable medium as recited in claim 44, wherein determining whether the performance of said hash table falls below said predetermined threshold comprises determining whether a predetermined percentage of the slots in said hash table are being used.

49. A computer-readable medium as recited in claim 44, wherein determining whether the performance of said hash table falls below said predetermined threshold comprises determining whether a predetermined percentage of accesses to said hash table result in collisions.

50. A computer-readable medium as recited in claim 44, wherein increasing the number of slots in said hash table comprises increasing the number of slots from n to 2n and rehashing and storing the data from said n slots into said 2n slots.

* * * * *